United States Patent [19]

Ruegg et al.

[11] 4,195,326
[45] Mar. 25, 1980

[54] PREDETERMINED TEMPERATURE COEFFICIENT CAPACITOR

[75] Inventors: Frank A. Ruegg, Brea; William A. Vitriol, Anaheim, both of Calif.

[73] Assignee: Beckman Instruments, Inc., Fullerton, Calif.

[21] Appl. No.: 832,327

[22] Filed: Sep. 12, 1977

[51] Int. Cl.² ............................................. H01G 4/36
[52] U.S. Cl. .................................. 361/274; 29/25.42; 361/282; 361/305; 361/321
[58] Field of Search ............... 361/274, 282, 271, 303, 361/305, 321; 29/25.42

[56] References Cited

U.S. PATENT DOCUMENTS

| 1,616,622 | 2/1927 | Horton | 361/282 |
| 2,448,887 | 9/1948 | Huckleberry | 361/274 |
| 2,642,476 | 6/1953 | Bugel et al. | 361/321 |
| 3,665,570 | 5/1972 | Brooks | 361/271 |

FOREIGN PATENT DOCUMENTS 262272  12/1926  United Kingdom ............... 361/271

*Primary Examiner*—E. A. Goldberg
*Attorney, Agent, or Firm*—R. J. Steinmeyer; F. L. Mehlhoff; William H. May

[57] ABSTRACT

A screen printed capacitor to provide a predetermined temperature coefficient of capacitance. The capacitance device utilizes a common electrode with a uniform dielectric layer in conjunction with two side-by-side base electrodes resulting in opposite polarity temperature coefficient of capacitance values. The proportion of the area of each of the side-by-side base electrodes with respect to each other determines the predetermined temperature coefficient of capacitance required.

8 Claims, 1 Drawing Figure

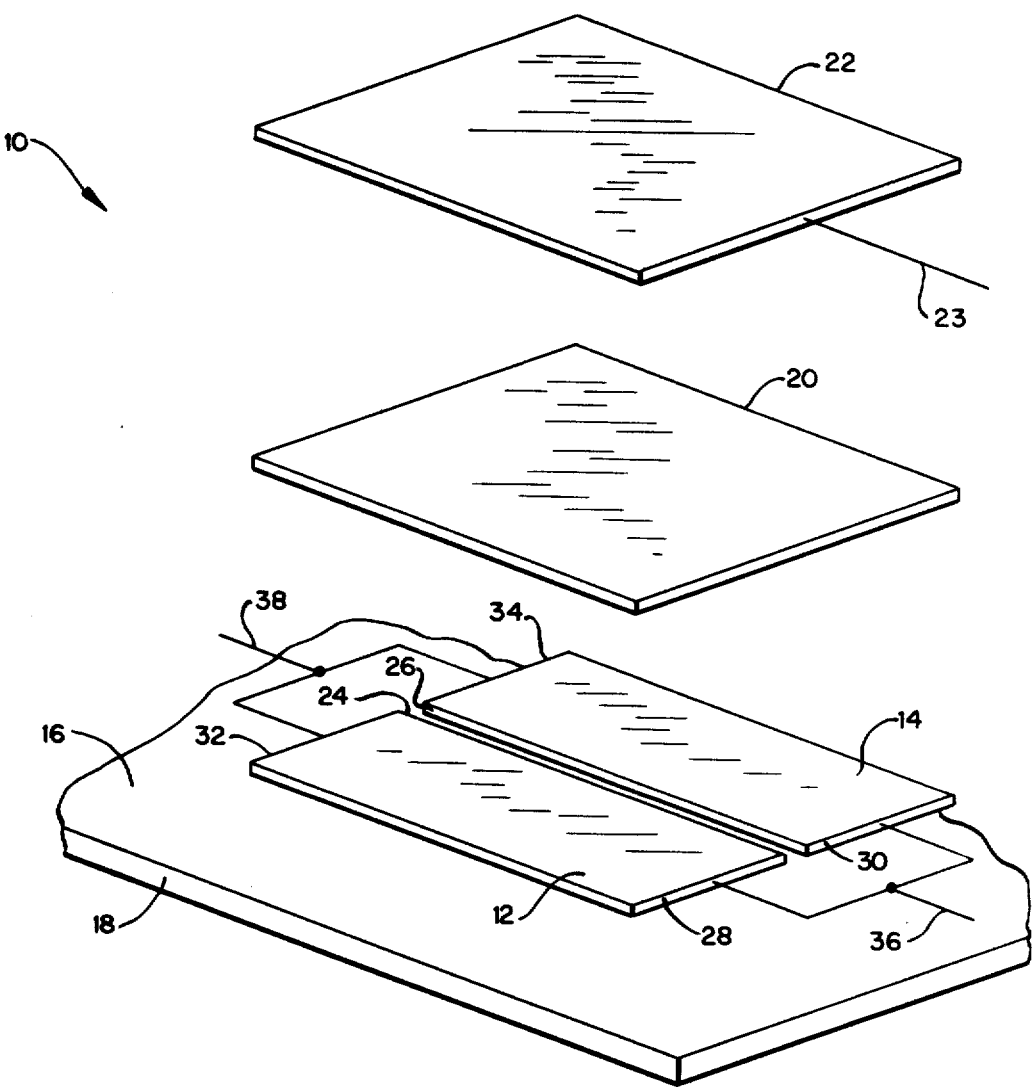

PREDETERMINED TEMPERATURE COEFFICIENT CAPACITOR

BACKGROUND OF THE INVENTION

This invention relates to thick film capacitors and more particularly is related to thick film capacitors which can compensate for changes in temperature which may occur that possibly affect the operational value of the electrical components in a circuit.

Existing screen printed capacitors are normally made by successively screening different layers of material on a suitable substrate such as alumina. Generally, one electrode is the first layer comprising a high temperature fired conductor while the second layer is a specially prepared insulator to form the dielectric. Over the dielectric a lower temperature fired conductor is screened to form the second electrode.

Typically, these capacitors can be made as separate electrical elements or, as generally desired, made with other elements such as resistors on a hybrid circuit. Because the dielectric layer must meet the requirements for a wide range of material capabilities and have the highest possible dielectric constant, it is generally not possible to produce a dielectric/conductor combination that will assure a zero temperature coefficient of capacitance (TCC).

A zero temperature coefficient of capacitance is generally desirable, because possible temperature changes in the circuit or the surrounding ambient conditions can cause undesirable variations in the value of the capacitor. These capacitance variations can cause undesirable effects on the electrical response of the circuit with the changing temperature. Consequently, it is desirable to provide a means to compensate for temperature variations of capacitance throughout certain ranges.

Typically, present screen printed capacitors do not have the ability to obtain zero temperature coefficient of capacitance, but do have the capability of producing a low temperature coefficient of capacitance value.

SUMMARY OF THE INVENTION

The present invention is a capactive device which uses two different first conductive layers to produce a capacitor having a preselected temperature coefficient of capacitance. It is possible through the use of this invention to acquire a zero temperature coefficient of capacitance. In this invention the two first layer conductors by use of different electrochemical effects produce different temperature coefficient of capacitance for the same dielectric layer. Generally the compatible first layers are chosen to have opposite signs of polarity temperature coefficient of capacitance values.

The utilization of the present invention allows for the ability to screen print a capacitor at the same time as other components such as resistors are screen printed. This increases the efficiency and economic production of hybrid circuits. The capacitors so produced by this method can have the zero temperature coefficient of capacitance value or, depending upon the requirements of the circuit, can have any predetermined or preselected temperature coefficient of capacitance by screen printing the two adjacent first layers of conductors with the desired temperature coefficient of capacitance values. The combination of these values in conjunction with the dielectric layer will produce the preselected temperature coefficient of capacitance.

In making a capacitive device of the present invention having the desired temperature coefficient of capacitance, it may be desirable to utilize some type of tailoring such as laser tailoring on the layers of electrodes in the capacitive device to achieve a desired value.

BRIEF DESCRIPTION OF THE DRAWINGS

The drawing is an exploded perspective view of the present invention.

DETAILED DESCRIPTION OF THE INVENTION

The construction of the capacitive device 10 of the present invention is shown in the drawing having two first layer or base conductors 12 and 14 which are screen printed on the top surface 16 of the substrate 18. Screen printed over the two first layer conductors 12 and 14 is one or more dielectric layers 20. Screen printed over the uniform dielectric layer material 20 is a common top electrode or conductive layer 22 having a conductive lead 23.

One of the first layer conductors 12 is made of a material which operates in conjunction with the material of the dielectric 20 to produce a positive temperature coefficient of capacitance while the material of the other first layer conductor 14 is such that when it operates in conjunction with the dielectric layer 20, it produces a negative temperature coefficient of capacitance. An example of dielectric material 20 used could be $Bi_2O_3 \cdot TiO_2$. An example of the one first electrode layer 12 could be a silica free electrode while the other electrode 14 could be of a material containing silica. The combination of the first layer electrodes 12 and 14 operating in conjunction with the dielectric layer 20 and top conductor 22 provides a capacitive element which can be made to have a zero temperature coefficient of capacitance.

The first layer conductors 12 and 14 can be joined along their respective sides 24 and 26 or, as shown in the drawing, they can be connected at their first respective ends 28 and 30 as well as their other respective ends 32 and 34 by conductive leads 36 and 38 respectively.

The present invention eliminates the needed use of two capacitors to obtain a zero TCC. This invention provides one capacitive device which accomplishes the function of two separate capacitors connected in parallel. When one capacitor A having a positive TCC is connected in parallel with a second capacitor B having a negative TCC, cancellation of the temperature effects can be produced. To provide for a precise cancellation effect, the ratio of the capacitance values must be chosen in relation to their temperature coefficient of capacitance (TCC). An example of mathematically showing the principle of this invention based upon the concept of two capacitors connected in parallel is explained mathematically through the following equations:

Let X and Y be the two capacitor values at temperature $T_1$.

Then $X + TCC_X(T_2 - T_1)X$ and $Y + TCC_Y(T_2 - T_1)Y$ are the values of capacitance at temperature $T_2$ where the TCC's are the mean values over the temperature span $T_2 - T_1$.

For the sum capacitances to remain equal at $T_1$ and $T_2$ $$X + Y = X + TCC_x(T_2-T_1)X + Y + TCC_y(T_2-T_1)Y$$

which reduces to $$\frac{x}{y} = -\frac{TCC_y}{TCC_x}$$

A second equation is required to define the total capacitance $$C_t = X + Y$$

By solving the above equations, an equivalent capacitance of zero TCC can be realized to utilize within the envisioned temperature range in which components in a circuit are to operate. The present invention recognizes the ability to formulate in a single capacitive device the advantages of two capacitors in such a form that they can be easily made in a screen printed or thick film process concurrently with other screen printed components such as resistors being constructed in the hybrid circuit, contributing to a more economical and efficient construction of the overall hybrid circuit.

The method of making the present invention first utilizes the screen printing of the two different first conductors 12 and 14 on a substrate 18 such as alumina. These conductors are printed side by side with areas inversely proportional to their resultant TCC ratios. It should be noted that these first layer conductors can touch along their entire length or be connected at the exposed ends as shown in the drawing. The next step utilizes a common uniform dielectric layer 20 of a desired or specially prepared material screen printed over both conductors. Over the entire dielectric and first layer conductors is screen printed a final common conductor layer 22. It should be noted that after every screen printing step individual film firing is done between these layers. Furthermore, the dielectric may consist of one or more layers with each individually fired to give the required voltage rating and short circuit protection.

Although one of the primary purposes of the present invention is to provide a capacitive device having zero TCC, it should be recognized that TCC values other than zero may be desired. In such a case it is necessary only to change the ratio between the respective first layer conductors to produce the desired value. It may be desirable to utilize some type of tailoring approach to provide ultraprecision TCC. Such tailoring may be sandtailoring to remove selectively a portion of the top conductor layer over either of the different sign TCC conductors.

With respect to the previously given exemplary types of material for use as the dielectric 20 and the electrodes 12 and 14, attention is now directed to the TCC values available by using such materials. The one first layer electrode 12 which is silica free in conjunction with the $Bi_2O_3 \cdot TiO_2$ dielectric material typically produces a dielectric constant of 150 to 180 and a TCC of +600 ppm°C. The first layer electrode 14 having silica, operates in conjunction with the common dielectric layer to typically produce a dielectric constant of 90 to 120 and a TCC of −150 ppm/°C. Consequently, the characteristics of these respective first layer electrodes 12 and 14 in conjunction with the common dielectric 20 are combined in the present invention to obtain any TCC between −150 ppm/°C. and +600 ppm/°C. to include a capacitor having zero temperature coefficient of capacitance if desired.

What is claimed is:

1. A thick film capacitor with a predetermined fixed temperature coefficient of capacitance, said capacitor comprising:
    a substrate;
    a first layer of at least two separate electrodes of different materials positioned side by side in the same layer plane, said two separate electrodes being physically in contact with each other;
    a dielectric layer fired on said two separate electrodes; and
    a top layer electrode formed over said dielectric, the effects of said dielectric layer being fired over said two separate electrodes providing in conjunction with said top layer electrode a negative temperature coefficient of capacitance with one of said two separate electrodes and a positive temperature coefficient of capacitance with the other of said two separate electrodes, said two separate electrodes operating in conjunction with said top layer electrode to provide a capacitor with said predetermined temperature coefficient of capacitance.

2. A thick film capacitor as defined in claim 1 wherein said two separate electrodes are screened onto said substrate in an area inversely proportional to the ratio of the temperature coefficient of capacitance of each electrode.

3. A thick film capacitor as defined in claim 1 wherein said predetermined temperature coefficient of capacitance is one of a postive, negative or zero temperature coefficient of capacitance.

4. A thick film capacitor as defined in claim 1 wherein said substrate is alumina.

5. A thick film capacitor as defined in claim 1 wherein said one of said two separate electrodes contain silica and said dielectric comprises $Bi_2O_3 \cdot TiO_2$.

6. A thick film capacitor as defined in claim 1 wherein said other of said two separate electrodes is silica free.

7. A method of making a thick film capacitive device with a predetermined coefficient of capacitance comprising the steps of:
    screen printing a first base electrode with a specific material composition on a substrate;
    screen printing a second base electrode with a different material composition than said specific material composition in said first base electrode on said substrate in side by side contact with said first base electrode;
    firing said first and second base electrodes;
    screen printing a uniform dielectric layer over said first and second base electrodes;
    firing said dielectric layer to produce an electrochemical effect not only between said first base electrode and said dielectric layer but also between said second base electrode and said dielectric layer;
    screen printing a common electrode over said uniform dielectric layer so that said electrochemical effect between said first base electrode and said dielectric layer producing in operational conjunction with a common electrode a negative temperature coefficient of capacitance and so that said electrochemical effect between said second base electrode and said dielectric layer producing in operational conjunction with said common electrode a positive temperature coefficient of capacitance; and
    firing said common electrode.

8. A method of making a thick film capacitor device as defined in claim 7 and additionally comprising the step of tailoring the top conductor layer over one of said first and second base electrodes to provide a precise value of temperature coefficient of capacitance of said capacitor.

* * * * *